(No Model.)
M. B. RYAN.
ADJUSTABLE HANDLE BAR FOR BICYCLES.
No. 564,536. Patented July 21, 1896.
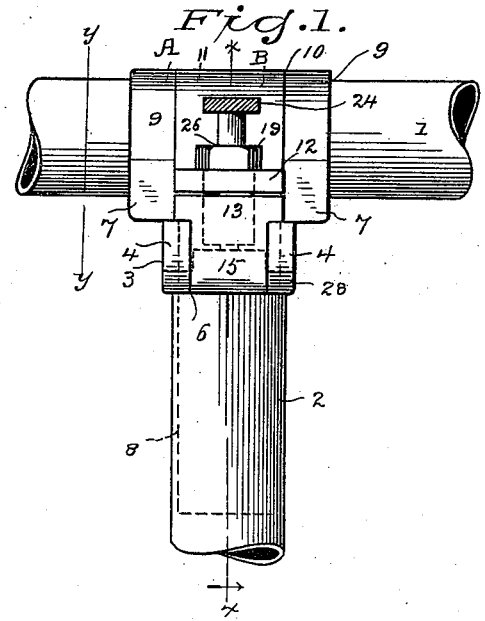
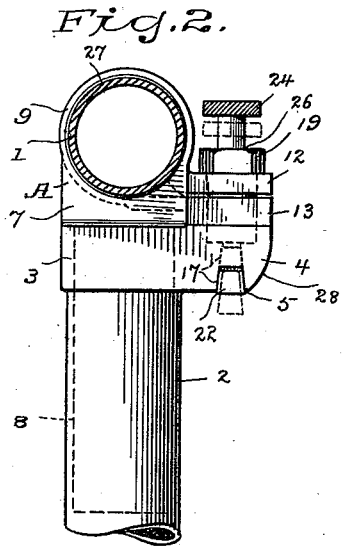
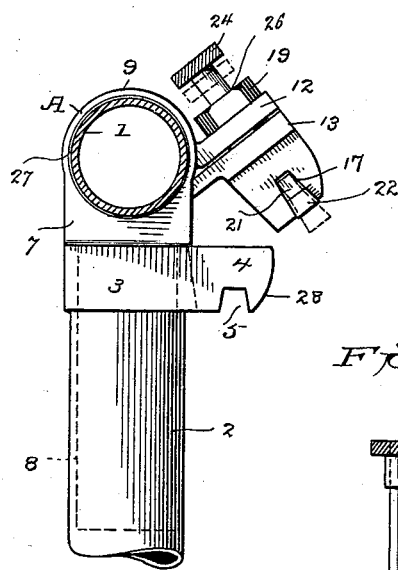
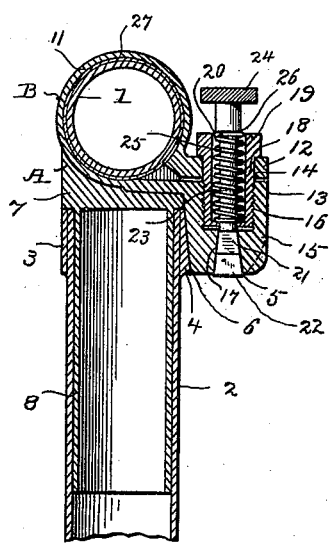
WITNESSES
INVENTOR

UNITED STATES PATENT OFFICE.

MICHAEL B. RYAN, OF BRIDGEPORT, CONNECTICUT, ASSIGNOR TO JOSEPHINE C. JACKMAN, OF SAME PLACE.

ADJUSTABLE HANDLE-BAR FOR BICYCLES.

SPECIFICATION forming part of Letters Patent No. 564,536, dated July 21, 1896.

Application filed September 10, 1895. Serial No. 562,040. (No model.)

*To all whom it may concern:*

Be it known that I, MICHAEL B. RYAN, a citizen of the United States, residing at Bridgeport, in the county of Fairfield and State of Connecticut, have invented certain new and useful Improvements in Adjustable Handle-Bars for Bicycles; and I do hereby declare the following to be a full, clear, and exact description of the invention, such as will enable others skilled in the art to which it appertains to make and use the same.

My invention relates to the class of adjustable and removable handle-bars for bicycles illustrated and described in my pending application for Letters Patent, Serial No. 556,718, filed July 2, 1895, the special features of construction being that the rider is enabled by a simple movement to adjust the handle-bar in the vertical plane and lock it in position after adjustment, or to swing the handle-bar in the horizontal plane so that it will lie parallel with the front wheel should it be required to lean the bicycle against a wall or to pass through a narrow passage, or to entirely remove the handle-bar from the bicycle should it be required to leave the latter unguarded, thereby rendering the bicycle useless; and my present invention has for its object to still further develop and perfect the general principle illustrated and described in my said former application. With this end in view I have devised the novel construction which I will now describe, referring by numbers and letters to the accompanying drawings, forming part of this specification, in which—

Figure 1 is an elevation of so much of the handle-bar and handle-bar post of a bicycle as is necessary to illustrate the application thereto of my novel adjustments, the view being from the rear; Fig. 2, a section on the line $y\ y$ in Fig. 1; Fig. 3, a similar view, but showing the handle-bar unlocked from the handle-bar post as for adjustment or removal; Fig. 4, a section on the line $x\ x$ in Fig. 1; and Fig. 5 is a view of the spring-catch detached.

1 denotes the handle-bar, and 2 the handle-bar post, which is provided with a head 3, having two rearwardly-extending arms 4, said arms having on their under sides locking-notches 5. The recess between the arms I have indicated by 6.

A denotes a yoke which consists, essentially, of a head 7, a shank 8, which is adapted to turn in the handle-bar post, and straps 9, which are adapted to inclose the handle-bar and in which the handle-bar is free to turn, the recess between said straps being indicated by 10.

B denotes a clamp which consists, essentially, of a strap 11, which incloses the handle-bar, lying between straps 9, and upper and lower arms, (designated, respectively, by 12 and 13.) The upper arm is provided with a vertical opening 14. The lower arm carries a head 15, which is provided with a threaded socket 16 and below said socket with a downwardly and outwardly tapering recess 17.

18 denotes a bolt, which is provided with a head 19, adapted to rest upon the top of arm 12, an unthreaded portion of the bolt passing through opening 14 and a threaded portion of the bolt engaging threaded socket 16 in head 15. This bolt is also provided with an internal recess 20.

21 denotes a tapering locking-catch, which lies in recess 17 in head 15, and whose ends 22 extend outward and engage the locking-notches 5 in arms 4.

23 denotes a shank by which the locking-catch is carried, and which extends upward through recess 20 and is provided with a head 24 for convenience in operation. A spring 25 in recess 20 bears against the bottom of said recess and against a shoulder 26 on shank 23 and acts to hold the locking-catch at the locking, i. e., the raised position, as clearly shown in the drawings.

In order to insure convenient centering of the yoke and clamp on the handle-bar in assembling and also to give additional strength to the handle-bar, I have shown in the drawings a sleeve 27, which may be brazed at the mid-length of the handle-bar. This sleeve, however, is not an essential feature of my invention. In assembling, the strap of the clamp is placed between the straps of the yoke and the handle-bar is passed through them until the center of the clamp is at the mid-length of the handle-bar.

The bolt, locking-catch, spring, shank, and head 24 are conveniently assembled, owing to the fact that the head is removable, as indicated in dotted lines in Fig. 5. Having assembled the parts, the clamp is locked to the handle-bar by turning bolt 18 inward, thereby drawing the arms together. Shank 8 may then be inserted in the handle-bar post, which will leave the parts in approximately the position shown in Fig. 3. The operator then swings the handle-bar, carrying the clamp to the locking position, as in Figs. 1, 2, and 4, head 15 passing into recess 10 between the straps of the yoke. In order to make the clamp self-locking when swung to the locking position, I provide bevels 28 upon arms 4, which, as the clamp is swung downward, are engaged by the ends 22 of the locking-catch, so that the latter will be forced outward against the power of spring 25. As soon as the clamp has reached the locking position, as in Figs. 1, 2, and 4, the spring will draw the locking-catch upward, causing ends 22 of the locking-catch to engage locking-notches 5 in arms 4, thus locking the handle-bar to the handle-bar post and preventing either the removal of the handle-bar or its movement in any direction until the locking-catch is moved out of engagement with the locking-notches by pressure upon head 24 and head 15 is swung out from recess 6. By placing the arms and head of the clamp in the central position I give the greatest possible strength, for the reason that downward pressure upon the handle-bar is directly against the center of the handle-bar post. Should the operator desire to remove the handle-bar or to swing it around in the horizontal plane, it is simply necessary to press down upon head 24, which disengages the locking-catch from the handle-bar post, and then swing the handle-bar, and with it the clamp and parts carried thereby, to substantially the position shown in Fig. 3. The handle-bar may then be removed from the handle-bar post or the handle-bar may be turned parallel with the front wheel, shank 8 turning in the handle-bar post.

Should it be required at any time to adjust the handle-bar in the vertical plane, i. e., raise or lower the handle-bar, the operator would simply turn bolt 18 backward far enough to relieve the pressure of the clamp on the handle-bar and would turn the latter to the desired position, locking it again as soon as the adjustment had been effected by tightening up the bolt again.

Having thus described my invention, I claim—

1. The combination with a bicycle handle-bar post having a head 3, and a handle-bar, of a yoke within which the handle-bar may turn and which is provided with a shank which may turn in the handle-bar post and be removed therefrom and an independent clamp which may be locked upon the handle-bar and carries a locking-catch to engage head 3.

2. The combination with a bicycle handle-bar post having a head 3 provided with a recess 6 and a handle-bar, of a yoke within which the handle-bar may turn and which is provided with a shank which may turn in the handle-bar post and be removed therefrom and a clamp at the mid-length of the handle-bar which may be locked thereto and carries a head 15 which in the locking position passes into recess 6 so that downward pressure upon the handle-bar will be central against the handle-bar post and means for locking said head in said recess.

3. The combination with a bicycle handle-bar post having a head 3 and a handle-bar, of a yoke within which the handle-bar may turn and which is provided with a shank which may turn in the handle-bar post and be removed therefrom and a clamp consisting of arms 12 and 13, a bolt passing through one of said arms and engaging the other arm to lock the clamp upon the handle-bar and a spring-actuated locking-catch carried by the clamp and engaging head 3 upon the handle-bar post.

4. The combination with a bicycle handle-bar post having a head 3 provided with a recess and locking-notches, and a handle-bar, of a yoke within which the handle-bar may turn and which is provided with a shank which may turn in the handle-bar post and be removed therefrom and a clamp consisting of an arm 12 having an opening 14 and an arm 13 having a head 15 provided with a threaded socket 16, a bolt passing through the opening and engaging the socket to lock the clamp upon the handle-bar and a spring-actuated locking-catch carried by said arms, said head passing into said recess in the locking position and the locking-catch engaging the locking-notches.

5. The combination with a bicycle handle-bar post having a head 3, and a handle-bar, of a yoke consisting of a head 7, a shank adapted to turn in the handle-bar post and straps extending from the head in which the handle-bar may turn and a clamp lying between said straps which may be locked upon the handle-bar post and carries a locking-catch adapted to engage head 3.

6. The combination with a bicycle handle-bar post having a head 3 provided with a recess and locking-notches, of a yoke within which the handle-bar may turn and a shank which may turn in the handle-bar post and be removed therefrom and a clamp consisting of a strap in which the handle-bar may turn and arms 12 and 13, said arm 13 being provided with a threaded socket and a tapering recess 17 below said socket, a bolt having a recess 20, and adapted to pass through arm 12 and to engage the socket in arm 13, a locking-catch lying in recess 17 and having ends adapted to engage the locking-notches in head 3, a shank extending upward from said locking-catch and through the bolt and a spring in recess 20 which acts to hold the locking-catch in operative position.

In testimony whereof I affix my signature in presence of two witnesses.

MICHAEL B. RYAN.

Witnesses:
A. M. WOOSTER,
S. V. RICHARDSON.